United States Patent
Andrew et al.

(10) Patent No.: US 6,364,602 B1
(45) Date of Patent: Apr. 2, 2002

(54) METHOD OF AIR-FLOW MEASUREMENT AND ACTIVE OPERATING LIMIT LINE MANAGEMENT FOR COMPRESSOR SURGE AVOIDANCE

(75) Inventors: Philip L. Andrew, Glenville; Chung-hei Yeung, Niskayuna; Joseph A. Cotroneo, Clifton Park; John David Stampfli, Delmar, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/478,523

(22) Filed: Jan. 6, 2000

(51) Int. Cl.[7] .................. F04D 17/14; F02C 13/10
(52) U.S. Cl. .................. 415/1; 415/17; 415/29; 415/49; 60/39.29
(58) Field of Search .................. 415/1, 26, 29, 415/17, 48, 49, 28; 60/39.02, 39.29, 39.27

(56) References Cited

U.S. PATENT DOCUMENTS

| | | | |
|---|---|---|---|
| 5,508,943 A | * 4/1996 | Baston et al. | 415/1 |
| 5,857,321 A | 1/1999 | Rajamani et al. | 60/39.27 |
| 5,915,917 A | * 6/1999 | Evker et al. | 415/1 |
| 6,141,951 A | * 11/2000 | Krukoski et al. | 60/39.29 |
| 6,226,974 B1 | * 5/2001 | Andrew et al. | 60/39.02 |

FOREIGN PATENT DOCUMENTS

| | | | |
|---|---|---|---|
| JP | 4-164135 | * | 6/1992 |
| JP | 7-158819 | * | 6/1995 |

OTHER PUBLICATIONS

Tarabrin et al; An Analysis of Axial Compressor Fouling and Blade Cleaning Method; Journal of Turbomachinery; Apr. 1998, vol. 120; pp. 256–261.

"Gas turbines—Acceptance tests"; International Standard ISO 2314; May 1, 1989; pp. 1–19.

* cited by examiner

Primary Examiner—Christopher Verdier
Assistant Examiner—Richard Woo
(74) Attorney, Agent, or Firm—Nixon & Vanderhye PC

(57) ABSTRACT

A transfer function between the inlet air-flow consumed by a Gas Turbine engine, and the engine parameters of speed, pressure ratio, and Inlet Guide Vane (IGV) angle is described. An active compressor Operating Limit Line (OLL) management strategy that leverages this improved flow measurement transfer function is also described. The improved flow measurement capability afforded by the transfer function permits a deterioration in flow rate caused by compressor fouling to be detected. Using the deterioration in flow rate as a proxy for compressor fouling, a degraded surge boundary associated with fouling can be predicted, using a transfer function between degradation of air-flow along operating line and degradation of surge line. In combination, the inventive improvements in flow measurement and operating line management afford added compressor surge protection across the operating range, while permitting the attainment of elevated pressure ratios associated with high thermodynamic efficiency and output.

20 Claims, 4 Drawing Sheets

METHOD OF AIR-FLOW MEASUREMENT AND ACTIVE OPERATING LIMIT LINE MANAGEMENT FOR COMPRESSOR SURGE AVOIDANCE

BACKGROUND OF THE INVENTION

The present invention relates to gas turbine control and, in particular to the management of compressor Operating Limit Line using an air-flow measurement technique.

The global market for efficient power generation equipment has been expanding in recent years and is anticipated to continue to expand in the future. The gas turbine combined cycle power plant, consisting of a gas turbine based topping cycle and a Rankine based bottoming cycle, continues to be a preferred choice for power generation due to relatively low plant investment costs and continuously improving operating efficiency of the gas turbine-based combined cycle, which minimizes electricity production costs.

By way of background and with reference to the schematic illustration of FIG. 1, a typical combined cycle gas turbine includes, in serial-flow relationship, an air intake or inlet, a compressor, a combustor, a turbine, a heat recovery steam generator (HRSG) and its associated steam turbine. Thus, air enters the axial flow compressor at 10 at ambient conditions. Ambient conditions vary from one location to another and day to day. Therefore, for comparative purposes standard conditions are used by the gas turbine industry. Those standard conditions are 59° F. (15° C.), 14.696 psia (1.013 bar), and 60% relative humidity. The standard conditions were established by the International Standards Organization ("ISO") and are generally referred to as ISO conditions.

The compressed air enters the combustion system at 12 where fuel is injected and combustion occurs. The combustion mixture leaves the combustion system and enters the turbine at 14. In the turbine section, energy of the hot gases is converted into work. This conversion takes place in two steps. The hot gases are expanded and the portion of the thermo-energy is converted into kinetic energy in the nozzle section of the turbine. Then, in the bucket section of the turbine a portion of the kinetic energy is transferred to the rotating buckets and converted to work. A portion of the work developed by the turbine is used to drive the compressor whereas the remainder is available for generating power. The exhaust gas leaves the turbine at 16 and flows to the HRSG.

The Brayton cycle is the thermodynamic cycle upon which all gas turbines operate. Every Brayton cycle can be characterized by pressure ratio and firing temperature. The pressure ratio of the cycle is the compressor discharge pressure at 12 divided by the compressor inlet pressure at 10. The General Electric Co. (GE), and we, define the firing temperature as the mass-flow mean total temperature at the stage 1 nozzle trailing edge plane. Another method of determining firing temperature is defined in ISO document 2314 "Gas Turbine-Acceptance Test". The firing temperature in that case is a reference turbine inlet temperature and not generally a temperature that exists in a gas turbine cycle; it is calculated using parameters obtained in a field test. Thus, this ISO reference temperature is always less than the true firing temperature as defined by GE, above.

A Brayton cycle may be evaluated using such parameters as pressure, temperature, specific heat, efficiency factors, and the adiabatic compression exponent. If such an analysis is applied to a Brayton cycle, the results can be displayed as a plot of cycle efficiency versus specific output of the cycle. Output per pound of air-flow is an important determination since the higher this value, the smaller the gas turbine required for the same output power. Thermal efficiency is important because it directly affects the operating fuel costs.

Many factors affect gas turbine performance. Air temperature, for example, is an important factor in gas turbine performance. Since the gas turbine receives ambient air as inlet air, its performance will be changed by anything that affects the mass flow of the air intake to the compressor; that is changes from the reference conditions of 59° F. and 14.696 psia. Each turbine model has its own temperature-effect curve as it depends on the cycle parameters and component efficiencies as well as air mass flow.

It is also well known that elevated firing temperature in the gas turbine is a key element in providing higher output per unit mass flow, enabling increased combined cycle efficiency, and that for a given firing temperature, there is an optimal cycle pressure ratio which maximizes combined cycle efficiency. The optimal cycle pressure ratio can be theoretically shown to trend ever-higher with increasing firing temperature. Compressors for these turbines are thus subjected to demands for higher levels of pressure ratio, with the simultaneous goals of minimal parts count, operational simplicity, and low overall cost. Moreover, the compressor must enable this heightened level of cycle pressure ratio at a compression efficiency that augments the overall cycle efficiency. Finally, the compressor must perform In an aerodynamically and aeromechanically stable manner under a wide range of mass flow rates associated with varying power output characteristics of combined cycle operation.

Air consumed by industrial gas turbine engines always contains an unknown amount of airborne, solid and liquid particulate. These include dirt, dust, pollen, insects, oil, sea-water salt, soot, unburned hydrocarbons, etc. Deposits form on the compressor turbo machinery blading when these airborne materials adhere to the blading and to each other, leading to changes in the blade aerodynamic profile, blade surface conditions, and flow incidence angle. This fouling causes a concomitant deterioration in the performance parameters of mass flow, thermodynamic efficiency, pressure ratio and surge pressure ratio. This later influence can cause a degradation in the margin between the operating pressure ratio and the surge line, commonly referred to as the surge margin. Tarabrin et al. advise that the magnitude of performance degradation due to fouling has been noted to be about 5% in mass flow, 2.5% in efficiency, and 10% in output. Moreover, a 5% decrease in mass flow has been associated with a reduction in output by 13% and an increase in heat rate by 5.5%. See Tarabrin et al., "An Analysis of Axial Compressor Fouling and a Blade Cleaning Method," *Journal of Turbomachinery*, Volume 120, April 1998, Pages 256–261.

The maximum pressure ratio that the compressor can deliver in continuous duty is commonly defined in terms of a margin from the surge pressure ratio line. Compressor surge is the low frequency oscillation of flow where the flow separates from the blades and reverses flow direction through the machine, i.e., it serves as a physical limit to compressor operation at a given speed.

The conventional approach to compressor protection is to program into the gas turbine control a so-called Operating Limit Line that affords a margin, typically between 5 and 25%, from a new and clean compressor surge boundary. One of the considerations in establishing this margin is a fixed allowance for the anticipated level of compressor fouling and the corresponding effect on surge margin. Once set, this allowance is not modified over time and/or operating conditions.

BRIEF SUMMARY OF THE INVENTION

The present invention was derived from the simultaneous need for high cycle pressure ratio commensurate with high efficiency and ample surge margin through-out the operating range of the compressor. The invention provides a design and operational strategy that provides optimal pressure ratio and surge margin for both the case where the inlet guide vanes are tracking along the nominal, full-flow schedule and where the inlet guide vanes (IGVs) are closed-down for reduced flow under Power-Turn-Down conditions.

More specifically, the invention provides for active management of the compressor Operating Limit Line using a flow sensing system to determine the amount of air-flow going through the system. By determining air-flow, and comparing it to an air-flow value stored in the gas turbine control, the degradation of flow with compressor fouling can be sensed. This compressor air-flow degradation is used to estimate potential surge-margin degradation and the Operating Limit Line can be changed as necessary or desirable to generally maintain the desired surge margin substantially throughout the range of operating conditions. This novel strategy serves to more fully utilize the pressure ratio capability of an industrial gas turbine compressor in order to achieve world class combined cycle operating efficiencies without increasing operational risks associated with compressor surge.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Efficient operation of the gas turbine requires that a number of critical turbine operating parameters be processed to determine optimal settings for controllable parameters such as fuel flow and distribution and intake air-flow. Such operating parameters include compressor inlet and outlet temperatures and pressures, exhaust temperature and pressure and the like. Thus, control of the power generated by a gas turbine is typically exercised through control of the fuel flow and air-flow into the combustor.

One example of a control system for a gas turbine is the General Electric Co.'s Speedtronic™ Mark V Control System, which is designed to fulfill all gas turbine control requirements, including speed and load control functions which act to control fuel flow under part-load conditions and temperature control which limits fuel flow to a maximum consistent with achieving rated firing temperatures, and controls air-flow via the inlet guide vanes. The Mark V Control System also handles sequencing of the auxiliaries to allow fully automated start-up, shut-down and cool-down. Incorporated in the basic system are turbine protection against adverse operating situations and annunciation of abnormal conditions. The operator interface to the Mark V Control System is in the form of a colorgraphic monitor and keyboard to provide feedback to the operator regarding current operating conditions and to allow input commands from the operator.

As noted above, the control system performs many functions including fuel, air and emissions control, sequencing of turbine fuel and auxiliary for start up, shutdown and cool down, synchronization and voltage matching of generator and system, monitoring of all turbine, control and auxiliary functions, and protection against unsafe and adverse operating conditions. All of these functions are performed in an integrated manner to perform the desired pre-programmed and/or operator input control philosophy.

Figure 1:
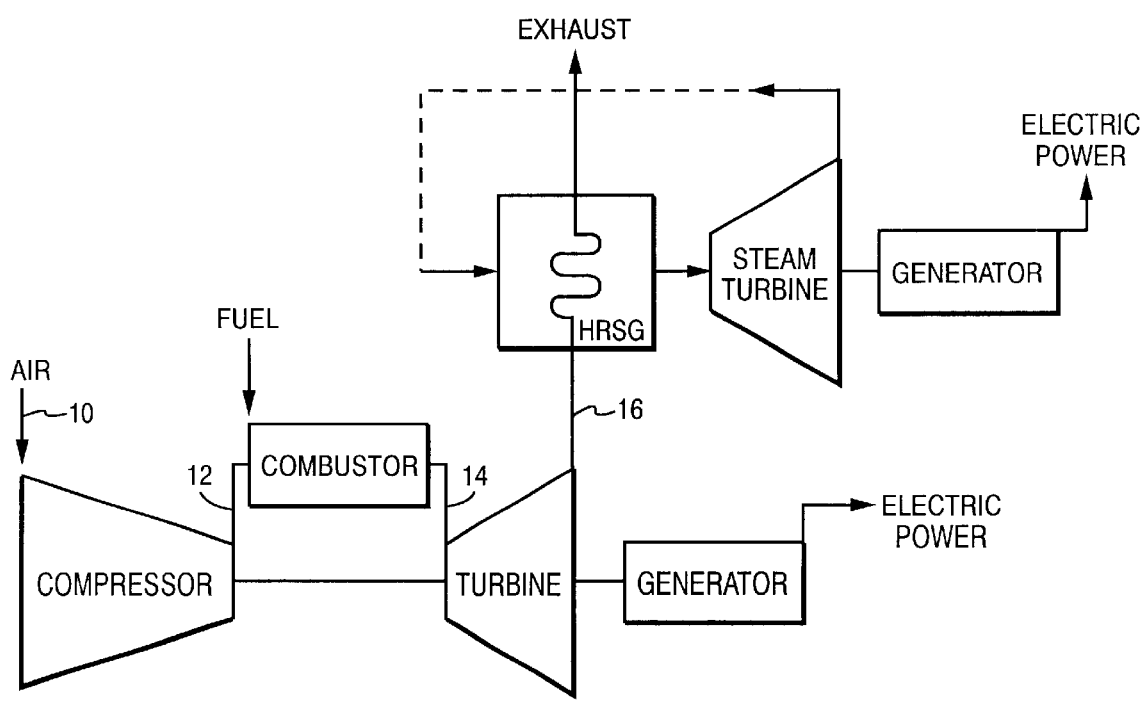
FIG. 1 is a schematic diagram of a combined cycle gas turbine.
Figure 2:
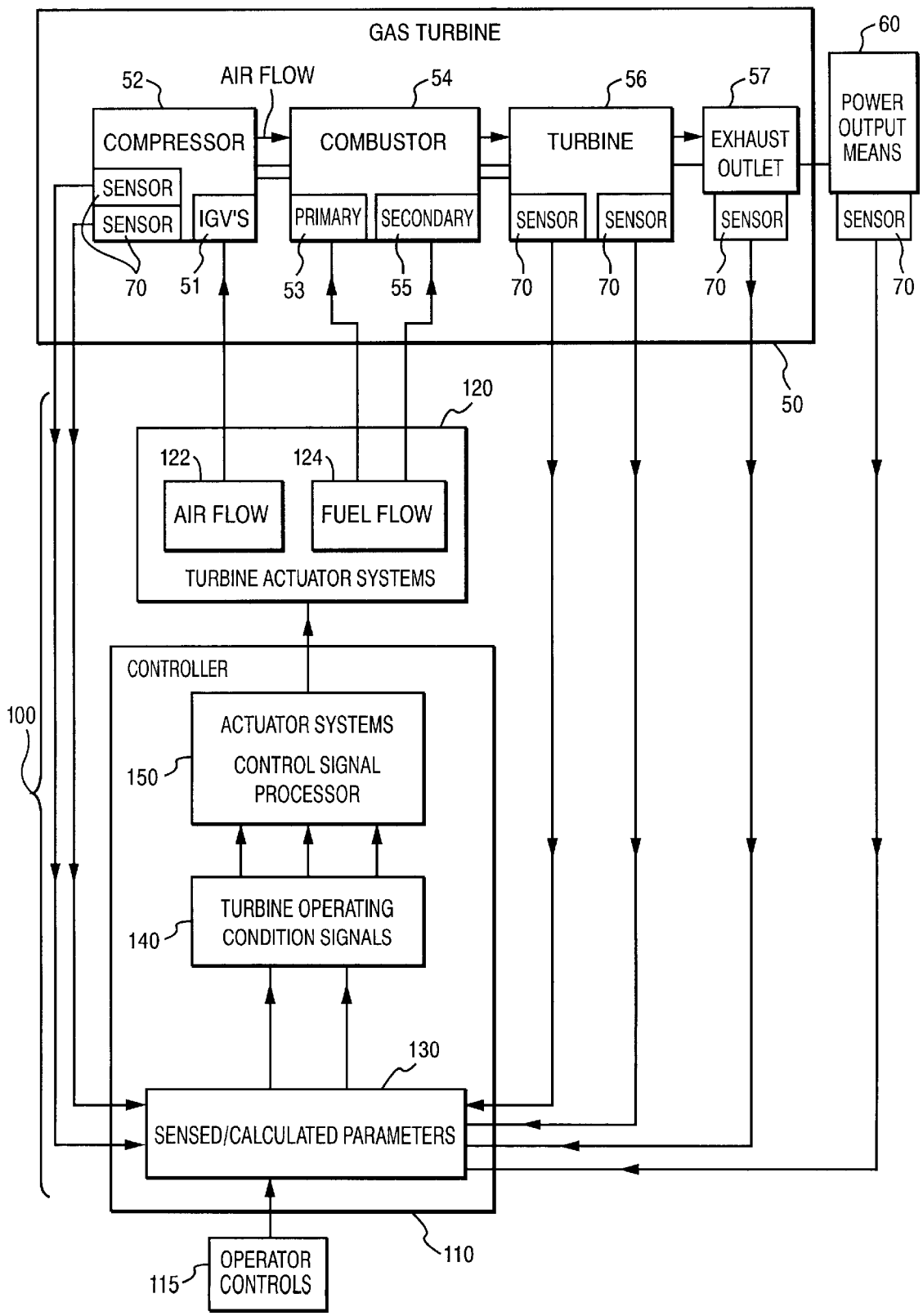
FIG. 2 is a block diagram of a gas turbine control system for implementing improved control according to the invention.

An exemplary turbine gas control system 100 is shown in the block-diagram of FIG. 2. This exemplary control system is described in greater detail in U.S. Pat. No. 5,857,321, the disclosure of which is incorporated herein by this reference. The gas turbine control system 100 is coupled to a gas turbine 50 to govern the operation of the turbine. As noted above, the gas turbine 50 typically comprises a compressor 52, a combustor 54, a turbine section 56, and an exhaust outlet 57. Gas turbine 50 is further typically coupled to a power output means 60, such as an electric generator, that is driven by turbine 50. Operation of turbine 50 may include, for example, a start up of the turbine, loading of the turbine, maintaining a steady state loaded condition so as to provide stable power output while optimizing fuel use and emission generation, and shutdown of the turbine.

Control system 100 comprises a controller 110 that is coupled to receive input from a plurality of sources, such as operator controls 115 and a plurality of sensors 70 coupled to turbine 50 and power output means 60. Controller 110 typically comprises an electronic processor adapted to generate a plurality of control signals in response to the plurality of input signals processed. As used herein, "adapted to" and the like refers to a device that comprises the circuitry and programming to enable the processing of signals representing turbine operating parameters in accordance with selected functions that enable the generation of a desired command to control turbine operation. Generating signals "in response to" or "in correspondence with" typically refers to processing the signals in accordance with a predetermined function that represents the relation between one or more parameters, and is typically represented by mathematical equations. One example of controller 110 is the GE Mark V controller. Controller 110 may comprise one or more electronic-type processing devices, such microprocessor chips, application-specific integrated circuits, signal conditioning circuitry, or the like. Alternatively, optical signal processors can be used in some applications for control of systems in which data are transmitted by means of optical energy.

Controller 110 is coupled to a system of turbine actuators 120 that are used to maintain or establish a particular turbine operating regime. By way of example and not limitation, actuator systems 120 typically comprise an air-flow control actuator 122 and a fuel flow actuator 124. Air-flow actuator 122 comprises a device for controlling air-flow into compressor 52, such as a positioning control for inlet guide vanes 51. Similarly, fuel flow actuator 124 comprises one or more devices for controlling fuel flow to the combustor, such as a primary zone fuel control valve 53 and also a secondary zone fuel control valve 55 for throttling fuel flow into combustor 54. For example, the primary fuel supply is mixed with inlet air prior to being burned in the combustion chamber and the secondary fuel supply is used to supply the flame in the combustion chamber. Such an arrangement is one means by which emissions from turbine 50 can be reduced; the effectiveness of the emissions reduction necessitates accurate control of the relative proportions of fuel being delivered by the primary and secondary manifolds. Controller 110 can also be coupled to additional actuating systems, such as bleed valves and cooling flow control valves that remove part of the air-flowing from the discharge of the compressor for use in other control needs.

Controller 110 is coupled to receive signals from the plurality of sensors 70 that in turn are coupled to gas turbine 50 and power output means Such sensors typically comprise temperature sensors, pressure sensors, flow sensors, humidity sensors, speed sensors, flame detector sensors, valve position sensors, guide vane angle sensors, or the like that sense various parameters pertinent to the operation of gas turbine 50. As used herein, "parameters" and similar terms refer to items that can be used to define the operating conditions of turbine 50, such as temperatures, pressures, and flows at defined locations in the turbine that can be used to represent a given turbine operating condition. Sensors 70 are typically coupled to controller 110 via a sensed parameters coupling device 130 such as a terminal board or the like.

Controller 110 further comprises processing means 140 for representing turbine operating conditions, such as with electrical signals that are representative of selected turbine operating parameters. Such turbine operation condition signals may be directly sensed, such as selected temperatures or pressures, or alternatively, may comprise calculated values (that is, determined from models embedded in controller 110 processor programming) for operating conditions parameters that are either difficult (or impossible) to directly measure (or sense). Commonly, turbine operating condition parameters that are calculated represent internal cycle parameters of the turbine, that is, values that are not directly measurable, but that can be represented (at least over a narrow range of sensed input values) by mathematical models representing sets of non-linear equations.

Turbine operating condition signals 140 are in turn coupled to an actuator system control signal processor 150 for generating control signals to turbine actuator systems 120 in correspondence with the turbine operating condition signals, for implementing the pre-programmed or input control strategy, discussed below.

Figure 3:
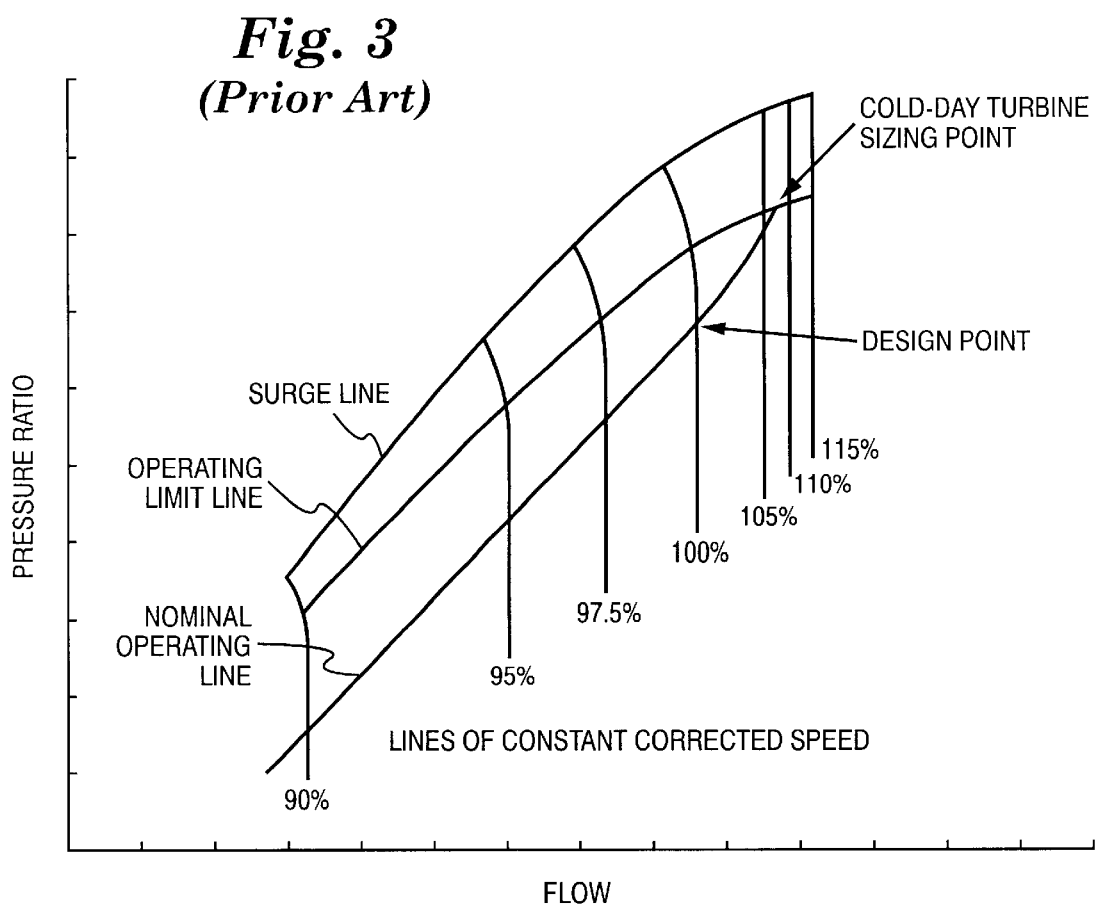
FIG. 3 is a map illustrating the performance characteristics of a conventional industrial gas turbine compressor.

Referring to FIG. 3, there is illustrated a typical gas turbine compressor map which is a plot of pressure ratio versus flow. The prior art compressor map is defined by several lines of constant rotational speed corrected to ISO conditions of 14.696 psia and 518.67° R.

The map of FIG. 3 is further defined by a line of surge pressure ratios. As noted above, the surge line is that pressure ratio at which the flow separates from the blades and reverses direction, i.e., the limit of the compressor at a given speed.

An Operating Limit Line is defined to provide a desired margin from the pressure ratios associated with operational limits, taking into account both surge pressure ratio and flow roll-back. These operational limits include the onset of rotating stall and the onset of excessive blade strains, at elevated pressure ratios near the surge line. Operation above the Operating Limit Line is not permitted by the gas turbine control system. Thus, the Operating Limit Line is the line established by the manufacturer of the gas turbine as the maximum operating limit for the compressor.

The nominal operating line is the operating condition at which the turbine and compressor will operate at varying speed. A nominal operating line of allowable combinations of pressure ratio and flow, is defined by the first-stage turbine nozzle area which is chosen to provide a desired surge margin at Cold-Day conditions. A design point is defined as the intersection of the 100% corrected speed line and the nominal operating line.

The invention provides for active management of compressor Operating Limit Line using a flow sensing system to determine the amount of air-flow going through the system. By determining air-flow, and comparing to an air-flow amount or value stored in the gas turbine control, the degradation of flow with compressor fouling can be sensed. This compressor air-flow degradation can then be used to estimate surge-margin degradation and the Operating Limit Line can be changed as necessary or desirable to generally maintain the desired surge margin substantially throughout the range of operating conditions.

In an exemplary embodiment of the invention, inlet air-flow is determined based on an inlet annulus flow coefficient Cq and detected values of air pressure and fluid temperature.

Figure 4:
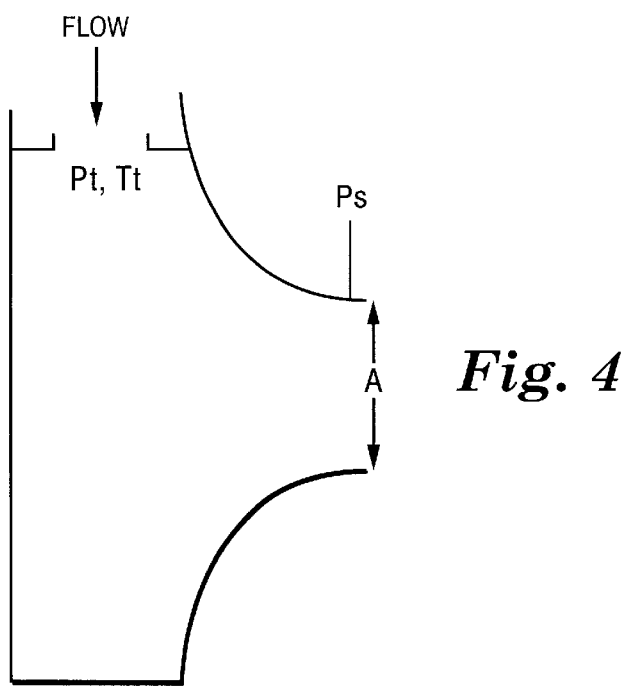
FIG. 4 is a schematic illustration of an inlet bell mouth illustrating measured pressures and temperatures in an embodiment of the invention.

More specifically, an inlet annulus flow coefficient Cq has previously been defined via a calibration based on measured inlet physical flow, static pressure, total pressure and total temperature according to the equation shown below, with reference to FIG. 4.

$$C_q = \frac{W_p * \sqrt{\frac{T_t}{P_t*(P_t - P_s)}}}{k * \sqrt{\frac{\gamma \left(\frac{P_s}{P_t}\right)^{\frac{2}{\gamma}} \left[1. - \left\{\frac{P_s}{P_t}\right\}^{\frac{\gamma-1}{\gamma}}\right]}{\{\gamma - 1\}\left[1. - \frac{P_s}{P_t}\right]}}} \quad \text{Equation 1}$$

$$k = A * \sqrt{2 * g_c / R}$$

Where:
Ps: 6 Sensor Average of Absolute Static Pressure at IGV
Pt: 4 Sensor Average of Absolute Total Pressure at Inlet Plenum
Tt: 4 Sensor Average of Absolute Total Temperature at Inlet Plenum
A: Flow area at Inlet Guide Vane Plane in Square Inches.
$g_c$: Constant: 32.174 foot-lbm/lbf-second$^2$
R: Constant 53.35 ft-lbf/lbm-° R
$\gamma$: Ratio of Specific Heats
Wp: Physical Flow rate in lbm per second.

A unique value of the flow coefficient could thus be determined for each gas turbine during factory testing prior to shipment, and that single, constant value of the flow coefficient could then be used, based on the design-point nominal flow condition.

In the improved system embodying the invention, the flow coefficient Cq is not calculated as a constant, but rather as a continuously-varying function of inlet guide vane setting, speed and pressure ratio, so that air-flow can be sensed during operation of the gas turbine.

More particularly, a transfer function between the inlet flow mass flow coefficient (Cq) and percent corrected speed (%Nc), inlet guide vane angle setting (IGV) in degrees, and pressure ratio (Xc) can be generated via a regression analysis of obtained test data. By way of example, test data was obtained during a compressor test vehicle (CTV) mapping test and a transfer function between the inlet flow mass flow coefficient (Cq) and percent corrected speed (%Nc), inlet guide vane angle setting (IGV) in degrees, and pressure ratio (Xc) was generated via a regression analysis as follows:

$$Cq = C_0 + C_1 IGV + C_2 \%Nc + C_3 Xc \quad \text{Equation 2}$$

For the particular gas turbine model used in this embodiment, $C_0 = +0.879$ $C_1 = +0.000553$, $C_2 = +0.000462$, $C_3 = -0.00161$, IGV has the units of degrees and varies from about 44 to about 88, Nc is dimensionless and ranges from 90% to 109%, and Xc is dimensionless and varies from 8 to 20. The foregoing are rounded-off values that are provided as an exemplary implementation of the invention, but the invention is not to be limited to these particular values.

In this exemplary application of the invention, to assess gas turbine air-flow in the field, the inlet coefficient expression Equation 1 above is solved for the physical flow parameter Wp. Measured pressures Ps, Pt and temperature Tt are then used in conjunction with the flow coefficient Cq, calculated in this example according to Equation 2, to calculate air-flow rate Wp.

Figure 5:
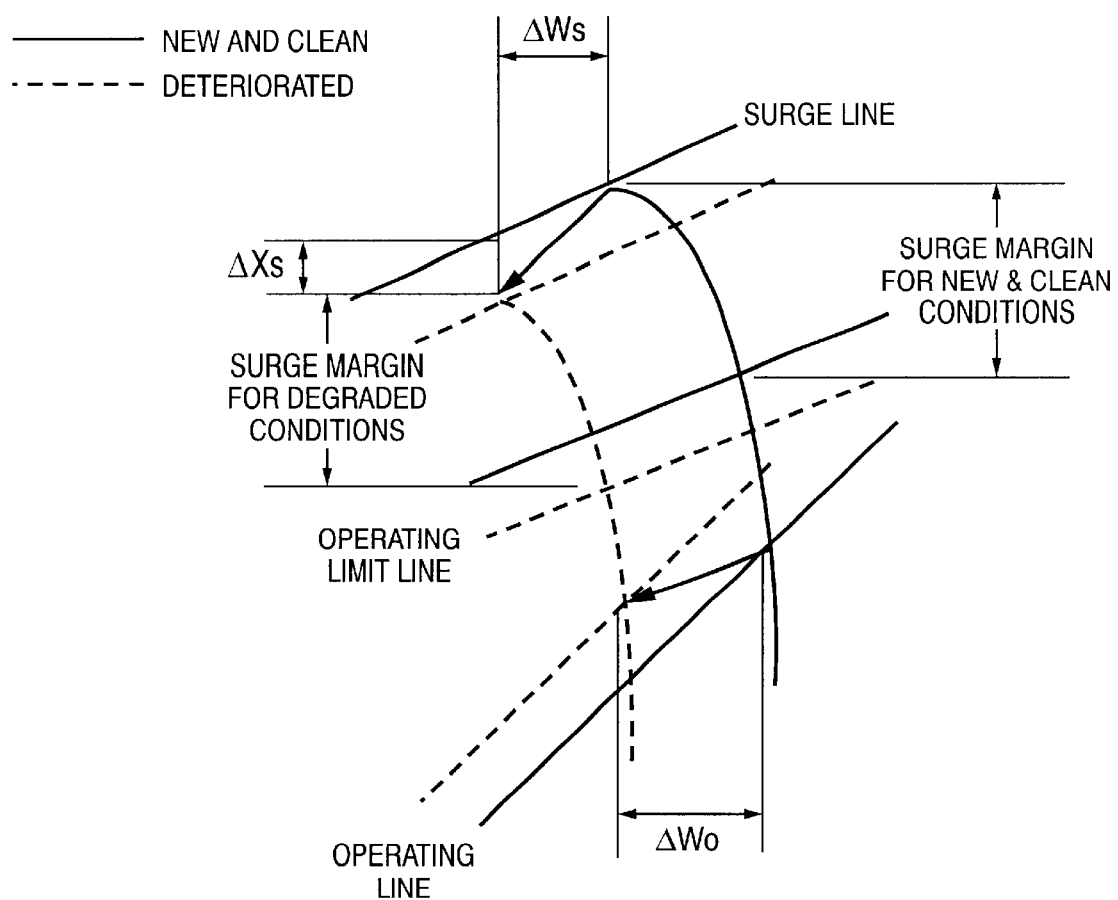
FIG. 5 is a schematic compressor map contrasting new and clean versus deteriorated/degraded compressor operation.

The invention can thus be advantageously embodied in a gas turbine which applies computing Equation 1 and Equation 2 to estimate inlet air-flow rate of a compressor based on a function of IGV angle, pressure ratio, and speed and the measured pressures Ps, Pt, and temperature Tt. The gas turbine control system compares this "sensed" or "measured" flow to stored air-flow value(s), for example, from a new-and-clean compressor performance map. The control then calculates the difference between the measured flow-rate and the stored, e.g., new-and-clean, flow rate ($\Delta$Wo) as a measure of the degree of fouling sustained by the compressor. A transfer function of the form $$\Delta Ws = K_1 \Delta Wo$$

$$\Delta Xs = K_2 \Delta Wo$$

may then be applied to compute the surge line degradation in terms of pressure ratio loss ($\Delta$Xs) and corrected flow loss ($\Delta$Ws), as depicted in FIG. 5, to determine a deteriorated surge line.

The values of $K_1$ and $K_2$ vary as a function of compressor inlet temperature, or equivalently, corrected speed (%Nc), and can be determined from an analysis of test data, for example. In one exemplary embodiment we have derived the following linear function for determining $K_1$:

$$K_1 = 0.089857 \times \%Nc - 7.9057$$

Furthermore, in this exemplary embodiment, we have derived a minimum and a maximum value for $K_2$, as follows:

$$K_2 \min = -0.06029 \times \%Nc + 6.40857$$

$$K_2 \max = -0.02286 \times \%Nc + 3.13571$$

In this exemplary embodiment, depending on the application and nature of the usage, pressure ratio loss ($\Delta$Xs) can be determined from the average of $K_2$min and $K_2$max, or a uniform distribution can be assumed with $K_2$min/$K_2$max defining the min/max of this distribution, and then pressure ratio loss ($\Delta$Xs) statistically determined as not one number but rather a set of numbers with the corresponding statistical characteristics.

The above coefficients are valid for Corrected Speeds of 90 to 100 (%), for simulation examples, we used $K_1 = 1.08$ and $K_2 = 0.60$. As noted above, coefficients can be derived for other values of corrected speed by data analysis.

A predetermined margin to the deteriorated surge line is then used by the control to compute and establish an adjusted Operating Limit Line. The adjusted Operating Limit Line would thereafter determine the upper limit of the operating pressure ratio permitted by the control system. Once the Operating Limit Line is changed or adjusted, subsequent fouling determinations could be made, for example, with reference to the measured air-flow that most recently triggered an Operating Limit Line change, or again with reference to new and clean values.

The invention thus provides for active control of the compressor Operating Limit Line using a air-flow sensing or measurement technique. In the presently preferred embodiment, discussed in detail above, compressor air-flow rate is determined based on the inlet annulus flow coefficient Cq and detected values of fluid pressure Ps, fluid pressure Pt, and fluid temperature Tt. However, those skilled in the art will appreciate that other now known or later developed flow sensing or determining methods may be used to advantage in the implementation of the invention. By measuring air-flow continuously, or at predetermined intervals as deemed necessary or desirable, and comparing the measured air-flow to a base line, new-and-clean performance stored in the gas line turbine control and/or to a measured air-flow that most recently triggered an Operating Limit Line change, the degradation of flow with compressor fouling can be sensed. This sensed air-flow degradation can then be used to estimate potential surge-margin degradation and the Operating Limit Line can be changed as necessary or desirable to substantially maintain the desired/target surge margin throughout the range of operating conditions, thereby to achieve desired operating efficiencies without increasing operational risks associated with compressor surge. In this regard, the system may provide for the estimation of surge-margin degradation and Operating Limit Line adjustment or recalculation each time $\Delta$Wo is calculated. In the alternative, the system control may be pre-programmed to provide, or the operator may have the option to input threshold values for variables such as $\Delta$Wo, to be exceeded for surge margin degradation to be estimated and/or for the Operating Limit Line to be changed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling a gas turbine to optimize performance thereof, comprising:
   providing a control system including a controller coupled to a plurality of turbine actuator systems, said actuator systems being coupled to a gas turbine that includes inlet guide vanes (IGV), a compressor, a combustor, and a combustion turbine, so as to control the operation of the gas turbine in response to respective actuator system control signals generated by the controller, said control system further comprising an operator interface; the controller comprising a processor for generating said respective actuator system control signals in correspondence with input from said operator interface and a plurality of turbine operating condition signals, said control system being programmed to define a pressure ratio Operating Limit Line that provides a surge margin from a surge line defined by pressure ratios associated with physical limits to compressor operation for the gas turbine;

during operation of said gas turbine, determining a compressor air-flow rate; and comparing said determined air-flow rate to a stored air-flow rate.

2. A method as in claim 1, wherein when said determined air-flow rate is less than said stored air-flow rate due to compressor fouling, the controller determines a corresponding degraded surge line.

3. A method as in claim 2, wherein the controller adjusts the Operating Limit Line to substantially maintain a target surge margin from said degraded surge line.

4. A method as in claim 1, wherein when said determined air-flow rate differs from said stored air-flow rate by at least a prescribed amount, the controller determines a corresponding degraded surge line.

5. A method as in claim 4, wherein the controller adjusts the Operating Limit Line to substantially maintain a target surge margin from said degraded surge line.

6. A method as in claim 1, wherein said determining step comprises determining said compressor air-flow rate based on an inlet annulus flow coefficient Cq.

7. A method as in claim 6, wherein said determining step further comprises determining said inlet flow coefficient Cq from an inlet guide vane setting, and a speed and pressure ratio of said compressor.

8. A method as in claim 6, wherein the gas turbine includes an inlet plenum, and further comprising:

sensing a fluid pressure Ps at a first sensing location;

sensing a fluid pressure Pt at a second sensing location;

sensing a fluid temperature Tt at said second sensing location; and wherein said compressor air-flow rate is determined based on the inlet annulus flow coefficient Cq and detected values of said fluid pressure Ps, said fluid pressure Pt, and said fluid temperature Tt.

9. A method as in claim 8, wherein said determining step comprises determining said inlet flow coefficient Cq from the inlet guide vane setting, and the speed and pressure ratio of said compressor.

10. A method as in claim 9, wherein said inlet flow coefficient Cq is determined from the functional expression:

$$Cq = C_0 + C_1 IGV + C_2 \%Nc + C_3 Xc$$

where $C_0$, $C_1$, $C_2$, and $C_3$ are constants, IGV is the inlet guide vane angle setting in degrees, %Nc is the percent corrected speed, and Xc is the pressure ratio.

11. A method as in claim 8, wherein said fluid pressure Ps is detected adjacent said inlet guide vanes.

12. A method as in claim 8, wherein said fluid pressure Pt is detected at said inlet plenum.

13. A method as in claim 8, wherein said compressor air-flow rate Wp is determined from the following equations:

$$C_q = \frac{Wp * \sqrt{\frac{Tt}{Pt*(Pt-Ps)}}}{k * \sqrt{\frac{\gamma \left(\frac{Ps}{Pt}\right)^{\frac{2}{\gamma}} \left[1 - \left(\frac{Ps}{Pt}\right)^{\frac{\gamma-1}{\gamma}}\right]}{(\gamma-1)\left[1 - \frac{Ps}{Pt}\right]}}}$$

$$k = A * \sqrt{2 * g_c / R}$$

Where:

A: Flow area at inlet Guide Vane Plane in Square Inches.

$g_c$: Constant: 32.174 foot-lbm/lbf-second$^2$

R: Constant 53.35 ft-lbf/lbm-° R, and

γ: Ratio of Specific Heats.

14. A method as in claim 13, wherein said determining step comprises determining said inlet flow coefficient Cq from the inlet guide vane setting, and the speed and pressure ratio of said compressor.

15. A method as in claim 14, wherein said inlet flow coefficient Cq is determined from the functional expression:

$$Cq = C_0 + C_1 IGV + C_2 \%Nc + C_3 Xc$$

where $C_0$, $C_1$, $C_2$, and $C_3$ are constants, IGV is the inlet guide vane angle setting in degrees, %Nc is the percent corrected speed, and Xc is the pressure ratio.

16. A method as in claim 1, further comprising determining a degree of fouling sustained by the compressor based on a difference between the determined air-flow rate and the stored air-flow rate.

17. A method as in claim 16, further comprising determining surge line degradation from pressure ratio loss (ΔXs) and corrected flow loss (ΔWs) determined as a function of fouling sustained by the compressor according to the following equations, $$\Delta Ws = K_1 \Delta Wo$$

$$\Delta Xs = K_2 \Delta Wo$$

where:

the values of $K_1$ and $K_2$ vary as a function of corrected speed (%Nc); and

ΔWo is the difference between the determined air-flow rate and the stored air-flow rate, thereby to determine a deteriorated surge line; and using a predetermined margin to the deteriorated surge line to determine and establish an adjusted Operating Limit Line.

18. A method of controlling a gas turbine to optimize performance thereof, comprising:

providing a control system including a controller coupled to a plurality of turbine actuator systems, said actuator systems being coupled to a gas turbine that includes an inlet plenum, inlet guide vanes (IGV), a compressor, a combustor, and a combustion turbine, so as to control the operation of the gas turbine in response to respective actuator system control signals generated by the controller, said control system further comprising an operator interface; the controller comprising a processor for generating said respective actuator system control signals in correspondence with input from said operator interface and a plurality of turbine operating condition signals, said control system being programmed to define a pressure ratio Operating Limit Line that provides a surge margin from a surge line defined by pressure ratios associated with physical limits to compressor operation for the gas turbine;

sensing a fluid pressure Ps at a first sensing location;

sensing a fluid pressure Pt at a second sensing location;

sensing a fluid temperature Tt at said second sensing location; and determining an inlet air-flow rate Wp based on detected values of pressures Ps, Pt, and temperature Tt, and as a function of IGV angle, pressure ratio, and speed;

comparing said determined air-flow rate to a stored air-flow rate; and when said determined air-flow rate is less than said stored air-flow rate, determining a surge line degradation from pressure ratio loss ($\Delta Xs$) and corrected flow loss ($\Delta Ws$) using the following equations:

$$\Delta Ws = K_1 \Delta Wo$$

$$\Delta Xs = K_2 \Delta Wo$$

where:

the values of $K_1$ and $K_2$ vary as a function of corrected speed (%Nc); and $\Delta Wo$ is the difference between the determined air-flow rate and the stored air-flow rate, thereby to determine a deteriorated surge line; and using a predetermined target margin to the degraded surge line to determine and establish an adjusted Operating Limit Line.

19. A method as in claim 18, wherein said inlet air-flow rate Wp is determined from the following equations:

$$C_q = \frac{Wp * \sqrt{\frac{Tt}{Pt*(Pt-Ps)}}}{k * \sqrt{\frac{\gamma \left\{\frac{Ps}{Pt}\right\}^{\frac{2}{\gamma}} \left[1. - \left\{\frac{Ps}{Pt}\right\}^{\frac{\gamma-1}{\gamma}}\right]}{\{\gamma-1\}\left[1. - \frac{Ps}{Pt}\right]}}}$$

$$k = A * \sqrt{2 * g_c / R}$$

and $$C_q = C_0 + C_1 IGV + C_2 \%Nc + C_3 Xc$$

where $C_0$, $C_1$, $C_2$, and $C_3$ are constants, IGV is the inlet guide vane angle setting in degrees, %Nc is the percent corrected speed, and Xc is the pressure ratio A: Flow area at Inlet Guide Vane Plane in Square Inches $g_c$: Constant: 32.174 foot-lbm/lbf-second$^2$ R: Constant 53.35 ft-lbf/lbm-° R, and $\gamma$: Ratio of Specific Heats.

20. A method as in claim 18, wherein when said determined air-flow rate differs from said stored air-flow rate by at least a prescribed amount, the controller determines said degraded surge line.

* * * * *